United States Patent [19]

Greenwood et al.

[11] Patent Number: 4,604,256

[45] Date of Patent: Aug. 5, 1986

[54] PROCESS AND APPARATUS FOR INJECTION MOLDING TIRE TREADS

[75] Inventors: Alan Greenwood, Kent; Norbert Majerus, Akron, both of Ohio

[73] Assignee: The Goodyear Tire & Rubber Company, Akron, Ohio

[21] Appl. No.: 760,937

[22] Filed: Jul. 31, 1985

[51] Int. Cl.⁴ .................. B29D 30/06; B29C 45/02; B29C 45/14

[52] U.S. Cl. .................. 264/501; 249/83; 249/91; 249/105; 249/107; 264/135; 264/161; 264/275; 264/279; 264/315; 264/328.3; 425/112; 425/115; 425/127; 425/129 R; 425/542; 425/544; 425/546

[58] Field of Search ............ 264/501, 135, 161, 275, 264/279, 315, 328.3; 249/57, 83, 91, 105, 107; 425/111, 112, 115, 127, 129 R, 542, 544, 546; 156/125

[56] References Cited

U.S. PATENT DOCUMENTS

| | | | |
|---|---|---|---|
| 2,476,884 | 7/1949 | Maynard | 154/14 |
| 2,569,935 | 10/1951 | Leguillon et al. | 154/9 |
| 2,724,425 | 11/1955 | Ostling | 154/14 |
| 2,744,290 | 5/1956 | Corson | 18/30 |
| 3,868,203 | 2/1975 | Turk | 425/242 |
| 3,901,961 | 8/1975 | Gorter et al. | 264/108 |
| 4,055,619 | 10/1977 | Goodfellow | 264/258 |
| 4,139,592 | 2/1979 | Gallizia | 264/279 |
| 4,140,454 | 2/1979 | Calori | 475/190 |
| 4,166,832 | 9/1979 | Gallizia | 264/279 |
| 4,181,482 | 1/1980 | Grawey et al. | 425/544 X |
| 4,257,994 | 3/1981 | Leblanc et al. | 264/102 |
| 4,309,161 | 1/1982 | Krebs et al. | 425/129 R X |

Primary Examiner—Jan Silbaugh
Attorney, Agent, or Firm—Frederick K. Lacher; T. P. Lewandowski

[57] ABSTRACT

Injection molding a tread on an annular tire casing (44) positioned in a mold (10') by introducing a fluid molding compound (76',78') at high pressures and high temperatures into a tread molding space (105) through runner passages (114) extending from an edge (116) to a centerplane (20'—20') of the mold (10') and having gates (118) opening into the tread molding space (105). Alternatively the runner passages (56,58) may be defined by annular runner surfaces (60,62,64,66) in communication with the tread molding space (48) through annular gates (52,54). The fluid molding compound (76,78) may be ejected from annular transfer recesses (68,70) in the mold (10) by squeeze rings (84,86) movable into the transfer recesses (68,70) to introduce the fluid molding compound (76,78) into the runner passages (56,58).

23 Claims, 6 Drawing Figures

PROCESS AND APPARATUS FOR INJECTION MOLDING TIRE TREADS

This invention relates to injection molding and especially high pressure, high temperature injection molding of the tread directly on a new or used buffed tire casing containing an inflated supporting bladder. Heretofore processes and apparatus have been proposed to injection mold treads on tires; however, the runner passages have been relatively long to provide even distribution of the fluid molding compound in the tread molding space or the distribution has not been even causing distortion of the casing. These processes and devices have not been satisfactory for injecting treads on radial tires which must meet high standards with respect to balanced force variations and runout. In order to meet these standards it is necessary that there be high pressure injection molding at the required pressures of around 5000 psi (351.5 kg/cm$^2$) and at high temperatures around 200° F. to 250° F. (93.3° C. to 121.1° C.) and the runner passages must be short and direct to completely fill the tread molding space with the fluid molding compound before the compound is cured. Also required is relatively high inflation pressure of from around 50 to 200 psi (3.56 to 14.1 kg/cm$^2$) to prevent distortion of the tire casing during injection molding.

Heretofore when the fluid molding compound was injected into a ribbed tread configuration there have been problems filling the rib molding spaces. Where the fluid molding compound has been injected into the tread molding space at the edges there has also been a problem venting and removing impurities carried by the leading surfaces of the injected streams of fluid molding compound.

The present invention provides an apparatus in which the source of fluid molding compound is close to the tread molding space and connected to the tread molding space by short direct runner passages having gates for even distribution of the high temperature fluid molding compound to all parts of the tread molding space. Accordingly, the space is filled before the fluid molding compound is cured. The sources of fluid molding compound may also be located on the sides of the mold so that the pressure used for compressing the fluid molding compound also serves to close the mold. Venting spaces have been positioned not only to facilitate removal of gases but also to remove impurities at the leading surfaces of the streams of fluid molding compound.

In accordance with an aspect of the invention there is provided an apparatus for injection molding of the tread portion of a tire comprising a mold having a tread molding ring member, the mold containing an annular tread molding space having a molding surface on the tread molding ring member, axially extending tread molding ring runner passages disposed in the tread molding ring member at circumferentially spaced positions separated from the molding surface, the runner passages being in communication with a source of fluid molding compound and a plurality of axially spaced gate orifices located along the runner passages and in communication with the tread molding space.

In accordance with another aspect of the invention there is provided an apparatus for injection molding of the tread portion of a tire comprising a mold having a tread molding ring member, the mold containing an annular tread molding space, the tread molding space having a molding surface on the tread molding ring member, annular side members at each side of the tread molding ring member, each of the side members having a runner surface, the tread molding ring member having at least one runner surface movable into closely spaced relationship with the runner surface of each of the side members to form generally annular gates and annular runner passages between the tread molding ring member and the side members in a closed position of the mold, the side members having side member passages in communication with a source of fluid molding compound and with the annular runner passages, and the generally annular gates being positioned at the edges of the tread molding ring member for introducing the fluid molding compound into the tread molding space at the edges of the tread molding ring.

In accordance with a still further aspect of the invention there is provided an apparatus for injection molding of the tread portion of a tire comprising a mold having separable annular side members for containing a tread molding ring member and supporting an inflatable tire casing providing a tread molding space between the tire casing and the tread molding ring member, each of the side members having side member runner passages in communication with tread molding ring runner passages, gate means in communication between the tread molding ring runner passages and the tread molding space, and injection means in communication with each of the side member runner passages to inject fluid molding compound through the tread molding ring runner passages and the gate means into the tread molding space from opposite sides of the mold to form the tread portion of the tire.

In accordance with still another aspect of the invention there is provided a process for injection molding the tread portion of a tire comprising:

(a) locating a tire casing in a tire mold having a tread molding ring member providing a tread molding space between the casing and a molding surface of the tread molding ring member in the closed condition of the mold;

(b) closing the mold with the tire casing therein;

(c) inflating the tire casing;

(d) introducing fluid molding compound into the tread molding space substantially uniformly around the circumference of the molding space while maintaining a temperature and pressure above the curing temperature and pressure of the fluid molding compound until the tread molding space is filled;

(e) at least partially curing the fluid molding compound in the tread molding space to mold the tread portion on the tire casing; and (f) opening the mold for removing the tire casing with the molded tread.

Other aspects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

Figure 1:
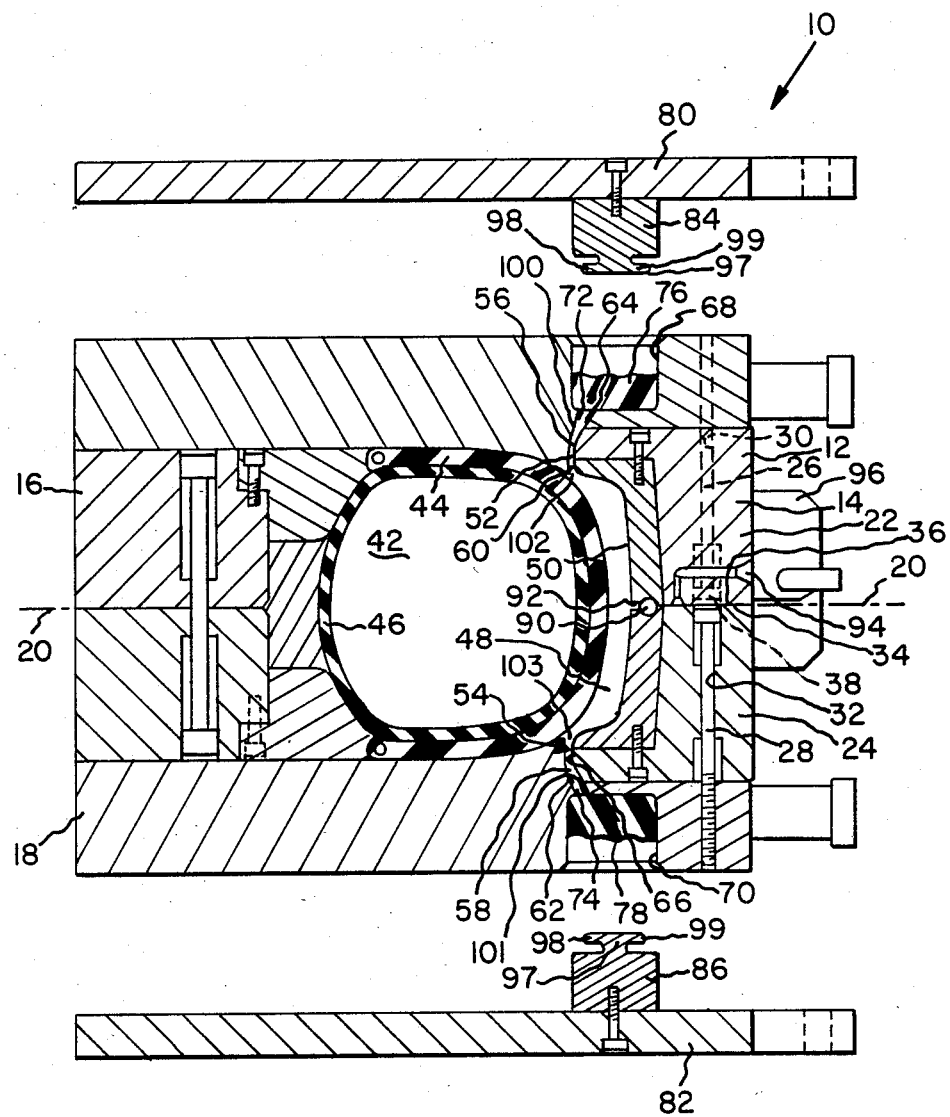
FIG. 1 is a radial section of one-half of a mold for injection molding a tread on a tire casing showing the casing located in the mold and the fluid molding compound in the transfer recesses before closing of the mold and injection of the molding compound by the squeeze rings.
Figure 2:
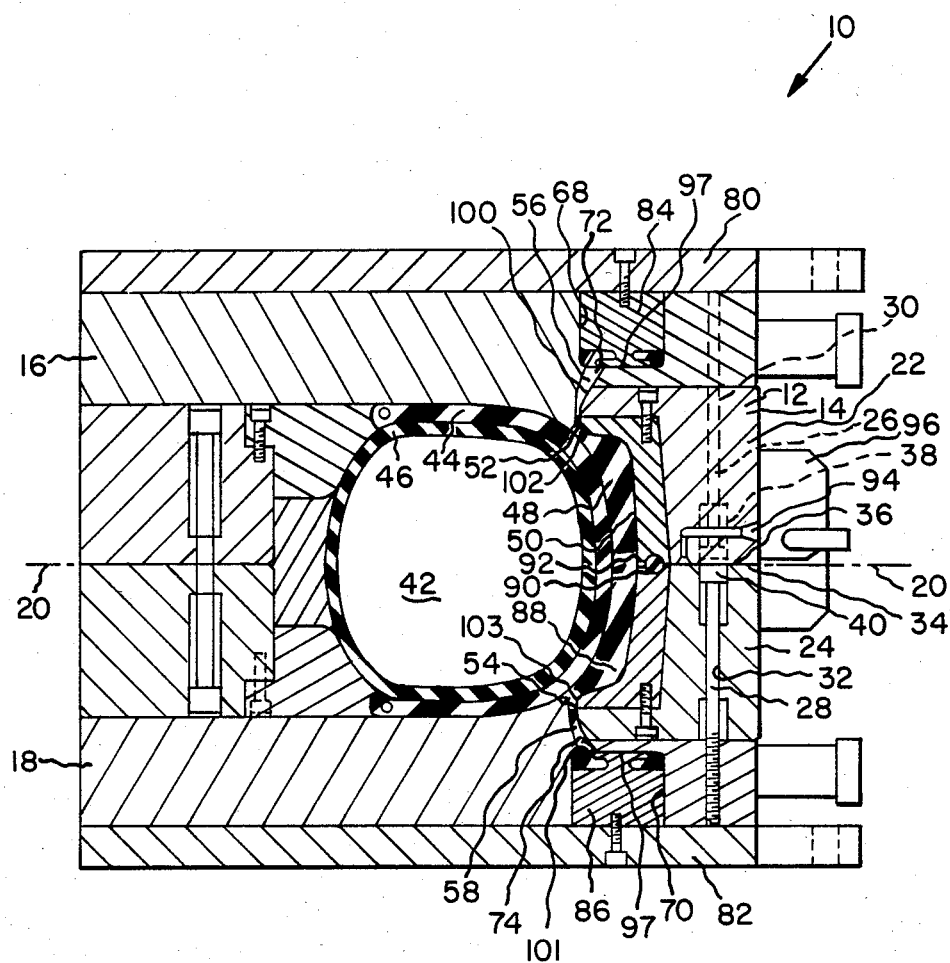
FIG. 2 is a sectional view like FIG. 1 showing the mold after closure and movement of the squeeze rings into the transfer recesses for injection of the compound into the tread molding space.
Figure 3:
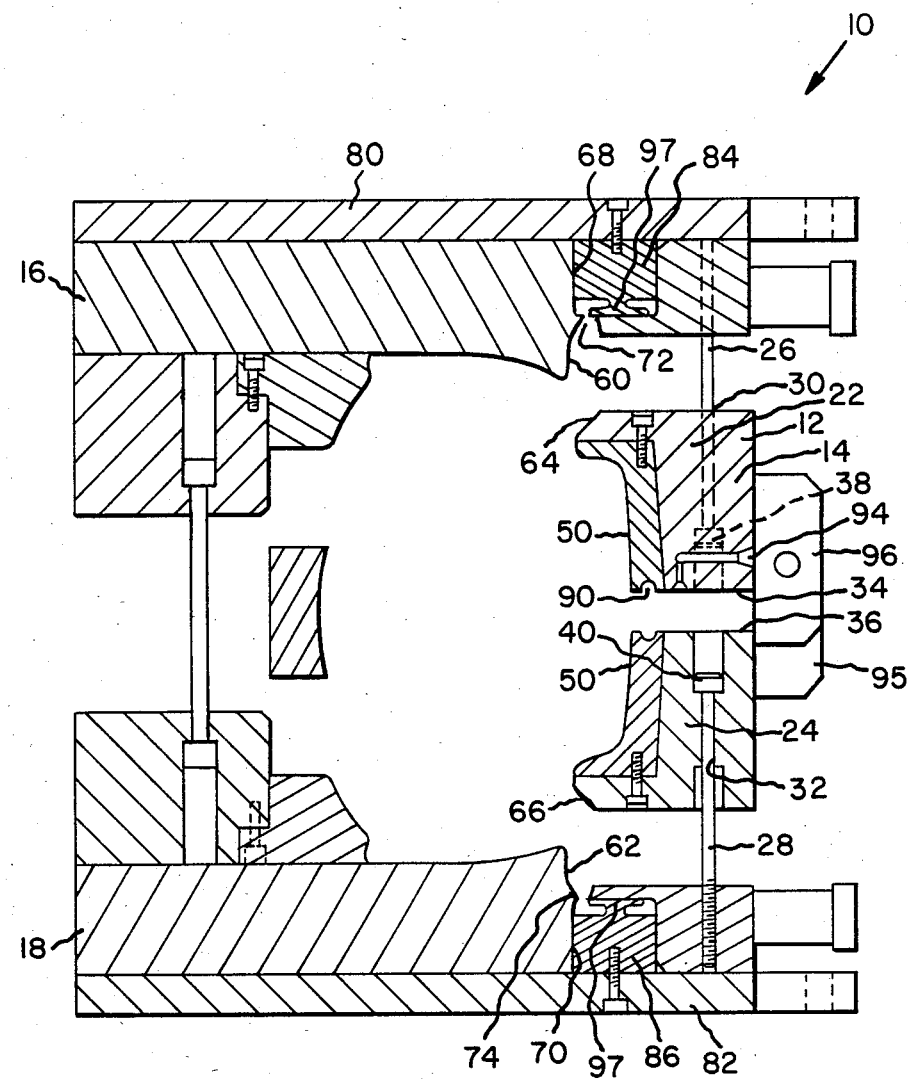
FIG. 3 is a sectional view like FIG. 2 showing the mold opened up and with parts separated for removal of the tire and sprues from the mold.

Referring to FIGS. 1, 2 and 3, a mold 10 is shown having a mold casing 12 including a tread molding ring member 14, a first annular side member 16 and a second annular side member 18. The tread molding ring member 14 may be split at the parting line or centerplane 20—20 of the mold 10 into a first ring section 22 and a second ring section 24. Means for supporting the first ring section 22 and second ring section 24 may include bolts 26 and 28, respectively, threaded in the first annular side member 16 and second annular side member 18 at circumferentially spaced positions and slidable in holes 30 and 32 in the first ring section 22 and second ring section 24 respectively. The holes 30 and 32 are in alignment with the bolts 26 and 28 and may be counterbored a predetermined depth at mating surfaces 34 and 36 of the first ring section 22 and second ring section 24, respectively, so that bolt heads 38 and 40 of the bolts 26 and 28 do not engage the shoulder of the counterbore holes 30 and 32 until the first ring section 22 and second ring section 24 have been displaced a predetermined distance from the first annular side member 16 and second annular side member 18 as shown in FIG. 3. This positioning occurs after opening of the mold 10 and mold casing 12.

In the closed position of the mold 10 and mold casing 12, as shown in FIGS. 1 and 2, the mating surfaces 34 and 36 of the first ring section 22 and second ring section 24 are in abutting relationship of the centerplane 20—20. The first annular side member 16 and second annular side member 18 are in abutting relationship with the first ring section 22 and second ring section 24, respectively, providing a mold cavity 42 for receiving a tire casing 44. The tire casing 44 may be inflated with a bladder 46 as shown in FIGS. 1 and 2. It is understood that in some applications the tire casing 44 may be mounted in the mold 10 and inflated without a bladder.

A tread molding space 48 is provided between the tire casing 44 and a molding surface 50 of the tread molding ring member 14. At the edges of the tread molding ring member 14 gate means such as annular gates 52 and 54 are provided in communication with the tread molding space 48 and tread molding ring runner passages 56 and 58 which may be annular and defined by runner surfaces 60 and 62 on the first side member 16 and second side member 18, respectively, and by runner surfaces 64 and 66. Axially outward of the tread molding ring runner passages 56 and 58 are annular transfer recesses 68 and 70 in the first side member 16 and second side member 18 respectively. Connecting the tread molding ring runner passages 56 and 58 and the annular transfer recesses 68 and 70 are a plurality of circumferentially spaced side member runner passages 72 and 74 for conveying a fluid molding compound 76 from the annular transfer recess 68 to the tread molding ring runner passage 56 and for conveying a fluid molding compound 78, which preferably is of the same material as the fluid molding compound 76, from the annular transfer recess 70 to the tread molding ring runner passage 58.

Outward of the first side member 16 and second side member 18 are a first plate member 80 and a second plate member 82 mounted for movement into engagement with the first annular side member 16 and second annular side member 18, respectively, as shown in FIG. 2. The first plate member 80 has a first squeeze ring 84 movable into the annular transfer recess 68 and the second plate member 82 has a second squeeze ring 86 movable into the annular transfer recess 70 for ejecting the fluid molding compounds 76 and 78 from the recesses into the tread molding space 48 through the annular gates 52 and 54 to mold a tread portion 88 on the surface of the tire casing 44 as shown in FIG. 2.

The mold 10 is closed by suitable pressure means which may be mechanical or hydraulic to press the plate members 80 and 82 axially into engagement with the first side member 16 and second side member 18, and to provide high pressure injection of the fluid molding compounds 76 and 78 at pressures of around 5,000 psi (351.5 kg/cm$^2$). Heating means such as steam may also be incorporated in the mold 10 to heat the fluid molding compounds 76 and 78 to a relatively high temperature of about 200° F. to 250° F. (93.3° C. to 121.1° C.). The mold 10 is closed rapidly at about 0.5 inches per second so that the fluid molding compounds 76 and 78 are rapidly and uniformly introduced into the tread molding space 48 from both edges of the tread molding ring member 14. During this process a stream of fluid molding compound 76 is injected through the annular gate 52 at the first ring section and a second stream of fluid molding compound 78 is injected through the annular gate 54 at the second ring section 24 and both streams move towards the centerplane 20—20 of the mold 10.

In accordance with this invention an annular recess 90 may be provided in the mating surfaces 34 and 36 of the first and second ring sections 22 and 24 and have an annular passage 92 in communication with the tread molding space 48. As the streams of fluid molding compounds 76 and 78 meet at the centerplane 20—20 of the mold 10 the leading surface portions join to form an interface portion which may be ejected into the recess 90 to segregate impurities in the interface portion from the tread portion 88. As shown in FIGS. 1 and 2, vacuum passages 94 may be provided in the first ring section 22 in communication with the recess 90 and with a source of vacuum (not shown) to increase the rate of filling of the tread molding space 48 with fluid molding compounds 76 and 78 and to increase the rate of ejection of the interface portion.

As shown in FIG. 1, the tire casing 44 may be conditioned by heating in a hot house at 180° F. (82.2° C.). The bladder 46 may then be inserted in the tire casing 44 and the tire casing and bladder 46 located in the mold cavity 42. The bladder 46 may then be inflated to a pressure of about 200 psi (14.1 kg/cm$^2$) after closing of the mold 10. If desired, a suitable adhesive may be applied to the radially outer surface of the mold casing 12 before placing the tire casing 44 in the mold 10. As shown in FIG. 2, the mold 10 is closed and pressure of about 1000 tons applied to the first plate member 80 and second plate member 82 for ejecting the fluid molding compounds 76 and 78.

After the tread portion 88 is molded on the tire casing 44 and at least partial curing has occurred in the mold 10 the mold may be opened by separating the first annular side member 16 and the second annular side member 18 as shown in FIG. 3. During the separation the first ring section 22 and the second ring section 24 may be pulled away from the first side member 16 and second side member 18 a distance depending upon the depth of the counterbores in the holes 30 and 32. After the first ring section 22 and second ring section 24 are separated from the first side member 16 and second side member 18 and the first ring section and second ring section are separated. Lugs 95 and 96 mounted on the ring sections 22 and 24, respectively, are also disconnected before the mold 10 is opened. This facilitates removal of the tire casing 44 with the tread portion 88 and also removal of the sprues and cured fluid molding compounds 76 and 78 from the recess 90, the tread molding ring runner passages 56 and 58, the annular gates 52 and 54 and the side member runner passages 72 and 74. The mold 10 is then ready for injection molding another tread portion 88 on another tire casing 44.

The injection molding described hereinabove is also desribed as "transfer molding". It is clear, however, that the invention may be practiced by injection molding where the fluid molding compounds 76 and 78 are injected into the tread molding spaced 48 directly from an injection molding machine. "Injection-transfer" molding may also be utilized where the fluid molding compounds 76 and 78 are injected into the transfer recesses 68 and 70 and then transferred by the squeeze rings 84 and 86 to the tread molding space 48.

Referring to FIG. 1, the first squeeze ring 84 and second squeeze ring 86 have anchor surfaces for attachment of the cured molding compound to the squeeze rings after cure. In this embodiment the anchor surfaces include a rib 97 on the surface of each of the squeeze rings 84 and 86 with flanges 98 and 99 at either side of the rib providing grooves between the flanges and the surface of the squeeze rings for retaining the fluid molding compound as it cures. Then when the side members 16 and 18 are separated from the ring sections 22 and 24, the cured rubber in the transfer recesses 68 and 70 is removed. The cured rubber from the transfer recesses 68 and 70 can then be pulled off the ribs on the surface of each of the squeeze rings 84 and 86.

Referring to FIG. 1, tear-off points 100 and 101 are shown at transfer recesses 68 and 70 in the runner passages 72 and 74. These passages 72 and 74 are preferably tapered from the interface of the tread molding ring member 14 and the side members 16 and 18 to the tear-off points 100 and 101. The diameter of the passages 72 and 74 at the tear-off points 100 and 101 is reduced, for example, to around 0.03125 inches (0.079 cm) to facilitate breaking off of the cured molding compound when the side members 16 and 18 are separated from the ring sections 22 and 24.

Tear-off areas 102 and 103 are also provided in the annular gates 52 and 54 at the edges of the tread molding space 48. The annular gates 52 and 54 are tapered from the molding ring runner passages 56 and 58 to the tread molding space 48 where the tear-off areas 102 and 103 have a thickness reduced, for example, to around 0.03125 inches (0.079 cm) to facilitate tearing. When the side members 16 and 18 and the ring sections 22 and 24 are pulled away from the cured tread portion 88, the cured molding compound in the annular gates 52 and 54 and in the molding ring runner passages 56 and 58 will be separated from the tire mold at the tear-off areas 102 and 103. Then when the side members 16 and 18 are separated from the ring sections 22 and 24, as shown in FIG. 3, the cured molding compound in the annular gates 52 and 54 and in the molding ring runner passages 56 and 58 can be removed from the mold 10.

Figure 4A:
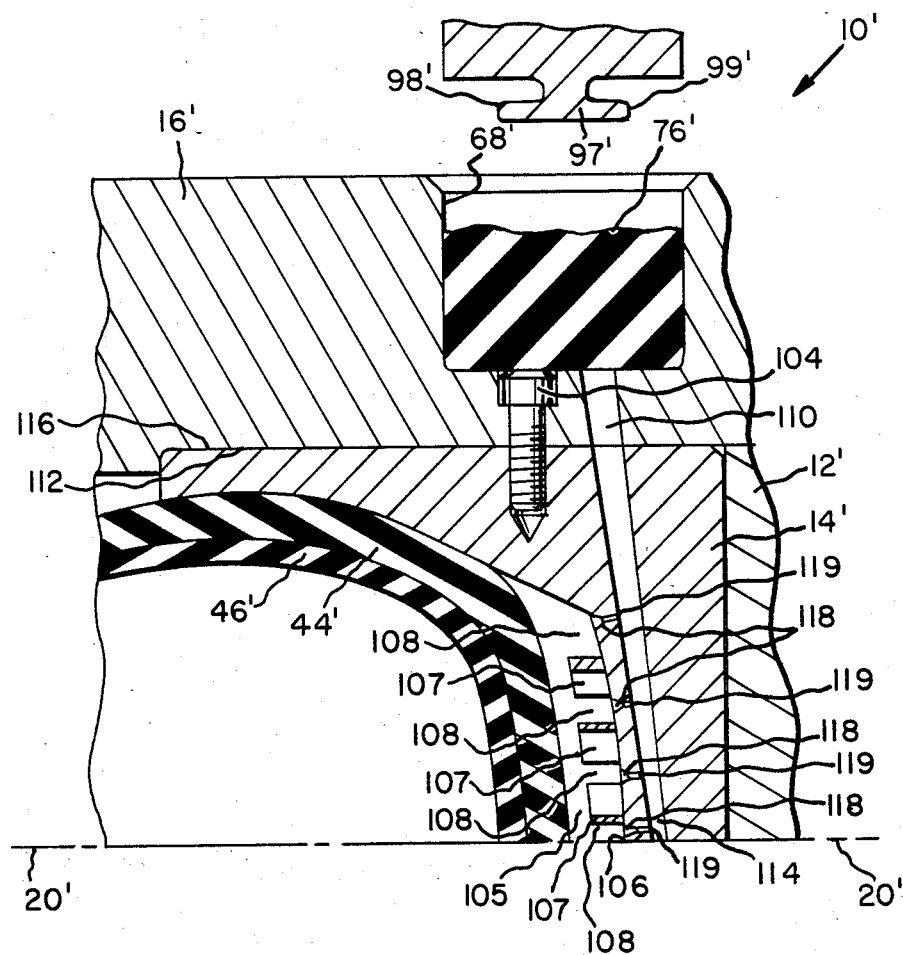
FIG. 4A is a fragmentary radial section of one-half of a modified mold construction in which the fluid molding compound is carried by a plurality of axially extending runner passages spaced apart circumferentially of the mold taken along the line 4A—4A in FIG. 4B.
Figure 4B:
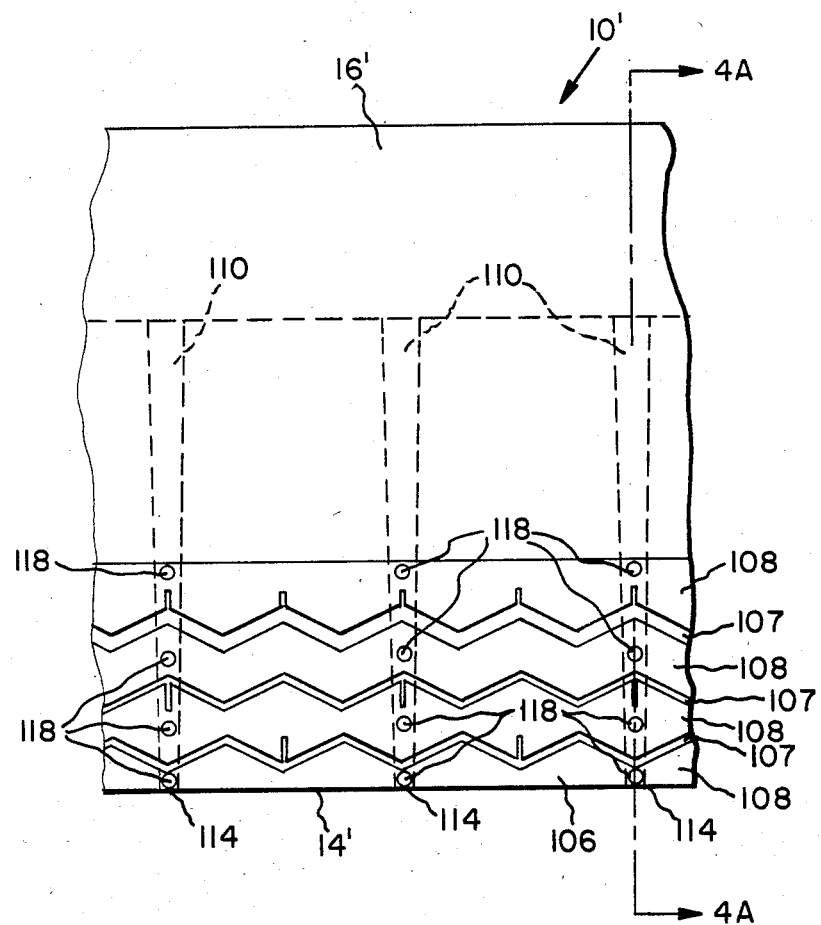
FIG. 4B is a fragmentary radial view of the molding surface of the tread molding ring shown in FIG. 4A with the tire casing and bladder removed showing the position of the gates and the rib separating strips.

With reference to FIGS. 4A and 4B, a modification is shown in which the mold 10' has a casing 12' with a first annular side member 16' and a tread molding ring member 14' bolted to the first annular side member as by bolts 104. A tread molding space 105 is located between the tire casing 44' containing the bladder 46' and a molding surface 106 of the tread molding ring member 14'. A plurality of spaced-apart rib separating strips 107 extend generally circumferentially of the molding ring member 14' to define rib forming spaces 108.

A source of fluid molding compound 76' such as annular transfer recess 68' is provided in the first side member 16'. A plurality of tapered side member runner passages 110 are provided between the annular transfer recess 68' and a mating edge 112 of the first side member 16'. The side member runner passages 110 are in alignment with a plurality of tapered, axially extending runner passages 114 in the tread molding ring member 14'. The side member runner passages 110 may be positioned at equally spaced positions circumferentially of the tread molding ring member 14' and extend from an edge 116 to the centerplane 20'—20' of the mold 10'. The side member runner passages 110 are tapered from a larger diameter at the edge 116 of the ring member to a smaller diameter at the centerplane 20—20. The number of runner passages 110 is determined by the properties of the fluid molding compound and, especially, the viscosity. In the present embodiment, forty runner passages are provided for a tire having a 40-inch (101.6 cm) diameter. Gate means such as a plurality of axially spaced gate orifices 118 are provided in the molding surface 106 of the tread molding ring member 14' and open into the rib forming spaces 108 between the rib separating strips 107. The gate orifices 118 may have tear-off points 119, as shown in FIG. 4A, to facilitate removal of the sprues from the runner passages 110 and removal of the tire from the mold 10'. The tearoff points 119 are at the surface of the runner passages 110 and have a diameter reduced, for example, to around 0.03125 inches (0.079 cm) to facilitate tearing. The gate orifices 118 are also tapered from the molding surface 106 to the tear-off points 119.

With the construction shown in FIGS. 4A and 4B, a tread portion 88 (not shown) may be injected into the tread molding space 105 in a manner similar to that described for the embodiment of FIGS. 1, 2 and 3, except that the fluid molding compound 76' is injected through the side member runner passages 110 and the tread mold ring runner passages 114 and then through the gate orifices 118 into the rib forming spaces 108 for filling the tread molding space uniformly and completely without leaving voids between the rib separating strips 107.

Figure 5:
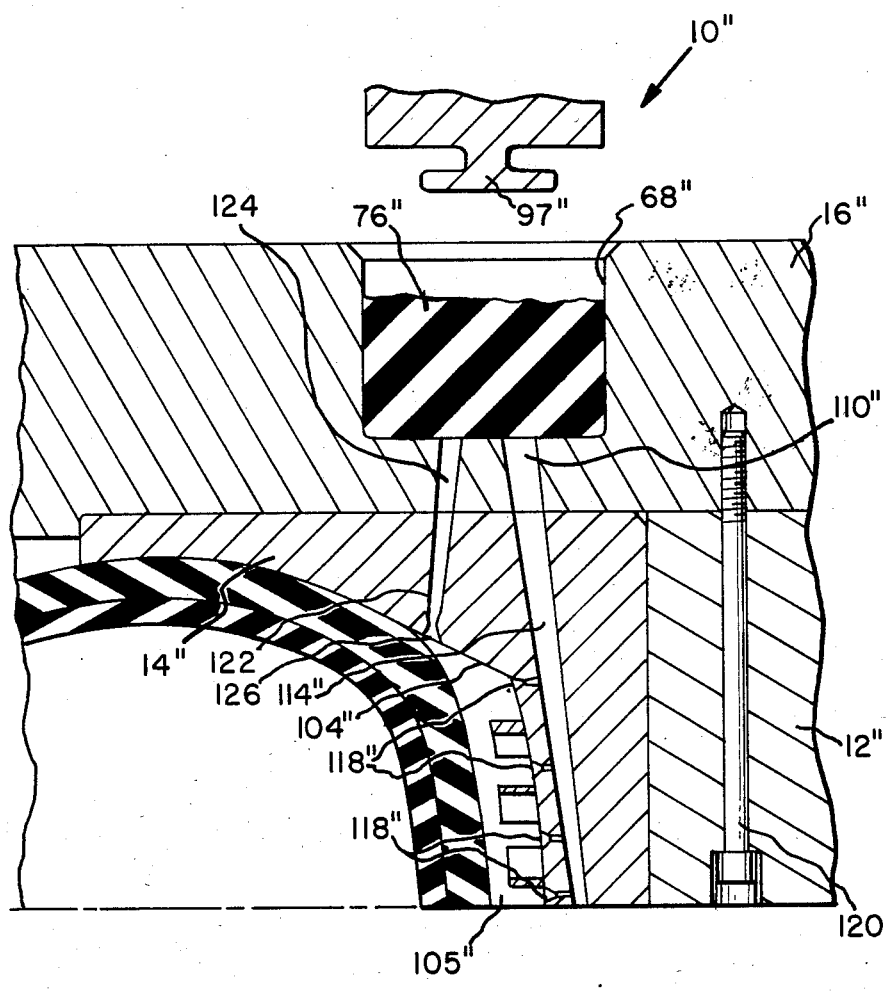
FIG. 5 is a fragmentary radial section like FIG. 4A of a modification of the invention.

Referring to FIG. 5, a further modification is shown in which the mold 10″ is identical with the mold 10′ of FIGS. 4A and 4B except the bolts 120 are provided for clamping the mold casing 12″ to the first side member 16″ and a plurality of circumferentially spaced edge forming runner passages 122 are provided in the tread moding ring 14″. The edge forming runner passages 122 spaced 105″ and in alignment with a second group of side member runner passages 124 opening on the annular transfer recess 68″. While the fluid molding compound 76″ is being ejected through the first side member runner passages 110″, the tread mold ring runner passages 114″ and the gate orifices 118″, the compound will be simultaneously injected into the tread molding space by the second group of side member runner passages 124 and the edge forming runner passages 122 to provide for uniform, direct and fast filling of the tread molding space 105″. The side member runner passage 124 and edge forming runner passages 122 are tapered from the annular transfer recess 68″ to tear-off points 126 having a diameter reduced, for example, to around 0.03125 inches (0.079 cm) at the tread molding surface 106″.

While certain representative embodiments and details have been shown for the purpose of illustrating the invention, it will be apparent to those skilled in the art that various other changes and modifictions may be made therein without departing from the spirit or scope of the invention.

What is claimed is:

1. Apparatus for injection molding of the tread portion of a tire comprising a mold having a tread molding ring member, said mold containing an annular tread molding space, said tread molding space having a molding surface on said tread molding ring member, annular side members at each side of said tread molding ring member, each of said side members having a runner surface, said tread molding ring member having at least one runner surface movable into closely spaced relationship with said runner surface of each of said side members to form generally annular gates and annular runner passages between said tread molding ring member and said side members in a closed position of said mold, said side members having side member passages in communication with a source of fluid molding compound and with said annular runner passages, and said generally annular gates being positioned at the edges of said tread molding ring member for introducing said fluid molding compound into said tread molding space at the edges of said tread molding ring member.

2. Apparatus in accordance with claim 1 wherein said tread molding ring member is split into a first ring section and a second ring section, said first ring section being movably mounted on one of said side members and said second ring section being movably mounted on the other of said side members, and means to support said first ring section and said second ring section in positions spaced from said side members after said tread is molded and said mold is opened to provide for removing sprues from said mold.

3. Apparatus in accordance with claim 2 wherein said first ring section and second ring section of said tread molding ring member having mating surfaces, at least one of said mating surfaces having a recess in communication with said tread molding space and in communication with a source of vacuum for venting said tread molding space and bleeding part of the fluid molding compound injected through said annular gates at each side of said tread molding ring member to remove impurities carried by the leading edges of streams of said fluid molding compound injected into said space.

4. Apparatus for injection molding of the tread portion of a tire comprising a mold having a tread molding ring member, separable annular side members for containing said tread molding ring member and including means for supporting an inflatable tire casing providing a tread molding space between said tire casing and said tread molding ring member, each of said side members having side member runner passages in communication with tread molding ring runner passages, gate means in communication between said tread molding ring runner passages and said tread molding space, and injection means in communication with each of said side member runner passages to simultaneously inject fluid molding compound through said tread molding ring runner passages and said gate means into said tread molding space from opposite sides of said mold to form said tread portion of said tire.

5. Apparatus in accordance with claim 4 wherein said injection means includes an annular transfer recess in each of said side members adjacent said tread molding space and in communication with said side member runner passages, plate members mounted for movement toward and away from said side members, each of said plate members having a squeeze ring for sliding engagement in said transfer recess, and means for moving said plate members away from said side members to open said transfer recess in each of said side members for introduction of a fluid molding compound into said transfer recess and means to move said plate members toward said side members to move said squeeze ring of each of said plate members into said transfer recess and inject said fluid molding compound into said side member runner passages.

6. Apparatus in accordance with claim 5 wherein said squeeze ring has an anchor surface for anchoring cured fluid molding compound so that after cure of said tread portion, cured compound remaining in said transfer recess and said side member runner passages and said tread molding ring runner passages may be removed by pulling said squeeze ring out of said transfer recess.

7. Apparatus in accordance with claim 6 wherein said anchor surface includes a rib on a surface of said squeeze ring with flanges at either side of said rib providing grooves between the flanges and said surface of said squeeze ring for anchoring the cured fluid molding compound.

8. Apparatus in accordance with claim 4 wherein said molding ring runner passages are disposed in said tread molding ring member at circumferentially spaced positions separated from said molding surface and said gate means includes a plurality of axially spaced gate orifice located along said tread molding ring runner passages.

9. Apparatus in accordance with claim 8 wherein said tread molding ring runner passages extend from at least one edge of said ring member to a centerplane of said mold.

10. Apparatus in accordance with claim 4 wherein each of said side members has a runner surface, said tread molding ring member having at least one runner surface movable into closely spaced relationship with said runner surfaces of each of said side members to form annular gates and said tread molding runner passages between said tread molding ring member and said side members in a closed position of said mold, said side member runner passages being in communication with said source of fluid molding compound and with said tread molding runner passages and said annular gates being positioned at the edges of said tread molding ring member for injecting said fluid molding compound into said tread molding space at the edges of said tread molding ring member.

11. Apparatus in accordance with claim 10 wherein said tread molding ring member has a tread molding surface, said annular gates taper from said tread molding runner passages to tear-off areas at said tread molding surface for breaking the cured fluid molding compound at said tear-off area during removal of said tire casing from said mold.

12. Apparatus in accordance with claim 11 wherein said tear-off area has a thickness of around 0.03125 inches (0.079 cm).

13. Apparatus in accordance with claim 10 wherein said side member runner passages are tapered from the interface of said tread molding ring member and said side members to tear-off points at said source of fluid molding compound.

14. Apparatus in accordance with claim 13 wherein said tear-off points have a circular cross section with a diameter of around 0.03125 inches (0.079 cm).

15. Apparatus in accordance with claim 11 wherein said side member runner passages are tapered from the interface of said tread molding ring member and said side members to said tear-off points at said source of fluid molding compound.

16. Apparatus in accordance with claim 10 wherein said tread molding ring member is split into first and second ring sections, said first ring section being movably mounted on one of said side members and said second ring section being movably mounted on the other of said side members, and means to support said first ring section and said second ring section in positions spaced from said side members after said tread portion in molded and said mold is opened to provide for removing sprues from said mold.

17. Apparatus in accordance with claim 16 wherein said first ring section and said second ring section of said tire molding ring member have mating surfaces, at least one of said mating surfaces having a recess in communication with said tread molding space and in communication with a source of vacuum for venting said tread molding space and bleeding part of the streams of fluid molding compound injected through said annular gates at each side of said tire molding ring member to remove impurities at the leading edges of said streams.

18. A process for injection molding the tread portion of a tire comprising:
  (a) locating a tire casing in a tire mold having a tread molding ring member providing a tread molding space between said casing and a molding surface of said tread molding ring member in the closed condition of said mold;
  (b) closing said mold with said tire casing therein;
  (c) inflating said tire casing;
  (d) introducing fluid molding compound into said tread molding space substantially uniformly around the circumference of said molding space while maintaining a temperature and pressure above the curing temperature and pressure of said fluid molding compound until said tread molding space is filled, said fluid molding compound being introduced from the side edges of said tread molding space through annular gate means positioned at each side edge of said tread molding space whereby said fluid molding compound flows toward the midplane of the tire casing without any appreciable flow in a circumferential direction and with said incoming flow providing two leading surface portions meeting at said midplane;
  (e) at least partially curing said fluid molding compound in said tread molding space to mold said tread portion on said tire casing; and
  (f) opening said mold for removing said tire casing with the molded tread.

19. The process of claim 18 wherein said annular gate means contain tear-off areas at said side edges and said fluid molding compound in said annular gate means is separated from said tread portion at said side edges after cure of said fluid molding compound.

20. The process of claim 19 wherein each of said annular gate means is in communication with an annular tread molding ring runner passage and said annular tread molding ring runner passage is connected to a source of fluid molding compound by side member runner passages having tear-off points further comprising separating said cured fluid molding compound in said tread molding ring runner passages and said source of fluid molding compound after cure of said tread portion.

21. The process of claim 18 wherein said tread molding ring member is split into first and second ring sections having mating surfaces with at least one of said mating surfaces having a recess in communication with said tread molding space and in communication with a source of vacuum, further comprising joining said leading surface portions to form an interface portion in said tread molding space, and ejecting said interface portion from said tread molding space into said recess.

22. The process of claim 21 wherein a vacuum is applied to said recess to increase the rate of filling said tread molding space with fluid molding compound and ejecting said interface portion.

23. The process of claim 18 including applying adhesive to said tire casing at a tread engaging surface prior to locating said tire casing in said tire mold for increasing the adherence of the molded tread portion to said tire casing.

* * * * *